March 8, 1966 D. G. HENRY 3,239,234
LOW BED AGRICULTURAL TRAILER
Filed May 6, 1964 2 Sheets-Sheet 1

DOYLE G. HENRY
INVENTOR.

BY: [signature]
Atty.

March 8, 1966 D. G. HENRY 3,239,234
LOW BED AGRICULTURAL TRAILER
Filed May 6, 1964 2 Sheets-Sheet 2

DOYLE G. HENRY
INVENTOR.

BY: *C. W. McAfee*
Atty.

United States Patent Office 3,239,234
Patented Mar. 8, 1966

3,239,234
LOW BED AGRICULTURAL TRAILER
Doyle G. Henry, Lubbock, Tex., assignor to Strong Trailer & Supply Co., Inc., Lubbock, Tex., a corporation of Texas
Filed May 6, 1964, Ser. No. 365,363
4 Claims. (Cl. 280—2)

This invention relates to agricultural trailers or wagons and more particularly to a general purpose farm trailer with a low bed.

In many agricultural situations it is desirable to have a general all purpose trailer with a very low bed. Such trailers are useful in hauling agricultural implements, equipment, and agricultural products such as cotton, hay, and fodder.

An object of this invention is to provide an agricultural trailer with an extremely low bed.

Other objects are to achieve the above with a trailer that is sturdy, compact, durable, simple, versatile, and reliable, yet inexpensive and easy to manufacture and operate.

The specific nature of the invention as well as other objects, uses, and advantages thereof will clearly appear from the following description and from the accompanying drawing, the different views of which are not to the same scale, in which.

Referring more specifically to the drawings, it may be seen that the trailer has a rear axle 10 with wheels and pneumatic tires 12. Likewise, the front axle 14 has wheels with pneumatic tires 16.

Figure 3:
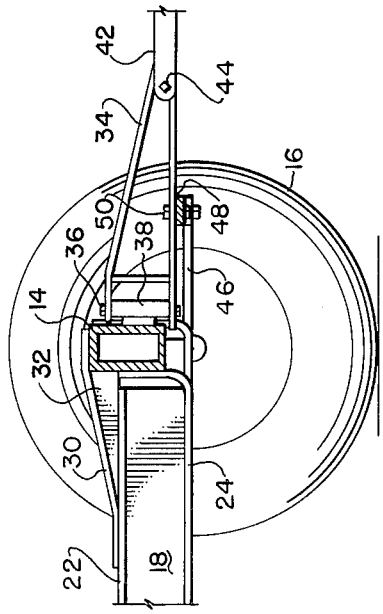
FIG. 3 is a sectional view showing rear axle construction taken on line 3—3 of FIG. 2.
Figure 4:
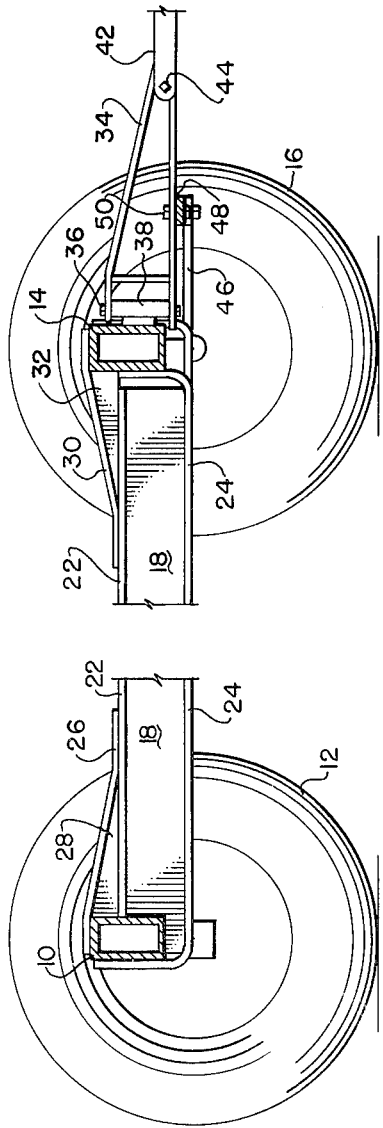
FIG. 4 is a sectional view showing front axle construction taken on line 4—4 of FIG. 2.

The front and rear axles both are boxed, i.e. constructed of two angle irons welded together so that in cross section they form a hollow rectangle (FIGS. 3 and 4). The front and rear axle are connected by center runner 18 and two side runners 20. There is no reach pole connecting the front and rear axle. Each of the three runners are in the form of a channel iron. The top of the runners 18 and 20 are lower than the top of the axles 10 and 14. The bottom of the runners 18 and 20 are below the bottom of the axles 10 and 14.

At the rear axle 10 each of the runners has a notch cut from the upper portion thereof. Therefore, the upper flange 22 of the channel shaped runners butts against the rear axle 10 at approximately the midpoint thereof. The web of the channel of each of the runners is cut away and the lower flange 24 is bent along the back side or outside of the rear axle 10, and is welded in position there. Strap 26 extends from the top of the upper flange 22 to the top of the rear axle 10 and is securely welded in place. Referring to FIG. 3, there will be a triangular space between the strap 26 and the upper flange 22 filled with gusset 28 which is welded both to the upper flange 22 and strap 26.

As may be seen in FIG. 4, the center runner 18 is connected to the front axle 14 by a strap 30 which is welded to the top of the upper flange 22 and to the top of the front axle 14. Gusset 32 fills the space between the strap 30 and the upper flange 22. The upper flange 22 and web are cut away and the lower flange 24 is bent upward and fits against the back or inside of the axle 14 and is welded in place there.

The side runners 20 are connected to the front axle 14 in the same manner as the runners are connected to the rear axle 10. I.e. the lower flange 24 extends to the front or outside of the front axle 14 and is welded in place there. Also, a strap and gusset are used to extend to the top of the front axle.

The steering mechanism extends in front of the front axle inasmuch as the runners 18 and 20 block its extension to the rear. Tongue 34 is pivoted to the front axle by vertical pin 36 which extends through vertical tube 38 welded to the front of the front axle 14. Bumpers 40 are welded to the front axle 14 on either side of the tube 38 to limit the swing of the tongue 34 thus preventing the tires 16 from striking the runners 20. Hitch 42 extends from the front of the tongue 34. The hitch is pivoted to the tongue 34 about a horizontal pin 44. Thus, is provided means for attaching the trailer to a towing vehicle (not shown).

The front wheels are mounted to the front axle 14 by spindles set to rotate about a vertical axis (not shown in detail). Arms 46 extend forward from the spindles. Connecting bars 48 are pivoted to each of the arms 46 and extend to the tongue 34, and are pivoted to the tongue by bolt 50. Therefore, it may be seen that the connecting bars 48 are connected to the tongue 34 between the horizontal pin 44 connecting the hitch 42 to the tongue 34 and a vertical pin 36 connecting the tongue 34 to the front axle 14. When the tongue is swung to the right or left about pin 36, the front wheels with tires 16 will swing to the right or left responsive to movement of the tongue.

As may be seen in the drawings, the connecting bars 48 are constructed of more than a single piece of metal and are bolted together with bolts extending through elongated slots. By this arrangement, the connecting bars 48 are made adjustable in length.

The floor of the bed of the trailer is made of wooden planks 52 which extend crosswise of the vehicle and are attached by metal screws 54 extending through the planks and into the upper flange 22 of the runners 18 and 20. A plurality of channel irons 56 the same thickness as the planks 52 are interspersed with the planks for additional strength. Particularly I have found it desirable to have a channel iron at the extreme forward and extreme rear end of the bed and at least one within the bed. A stringer 58 extends at each edge of the bed and is connected by bolts 55 to each of the planks 52 thereunder and to each of the channels 56. The stringer 58 may be constructed of either metal or wood and is illustrated as wood.

Figure 1:
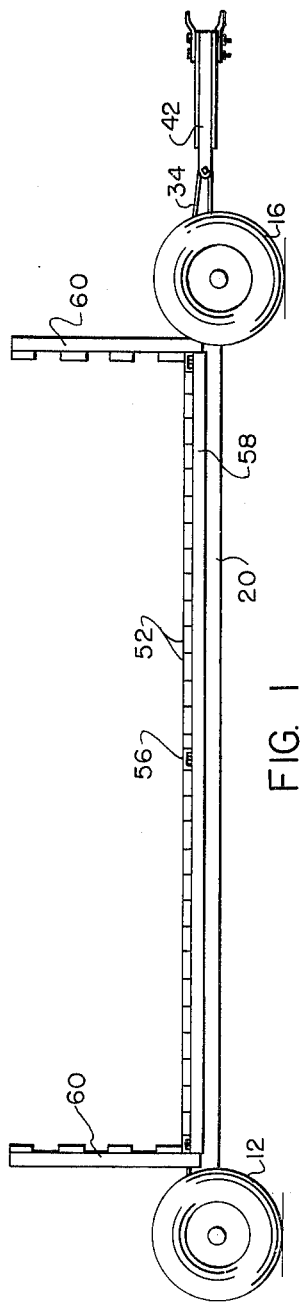
FIG. 1 is a side elevational view of a trailer according to this invention.
Figure 7:
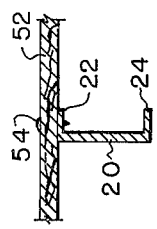
FIG. 7 is another sectional view showing bed construction taken on line 7—7 of FIG. 2.
Figure 6:
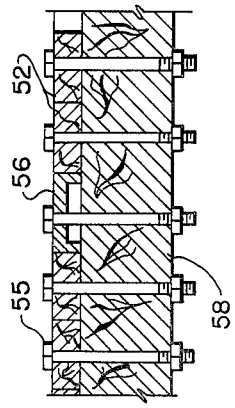
FIG. 6 is another sectional view showing the bed construction taken on line 6—6 of FIG. 2.
Figure 5:
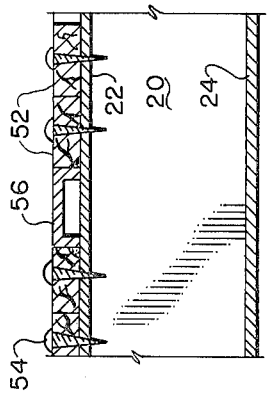
FIG. 5 is a sectional view showing the bed construction taken on line 5—5 of FIG. 2.
Figure 2:
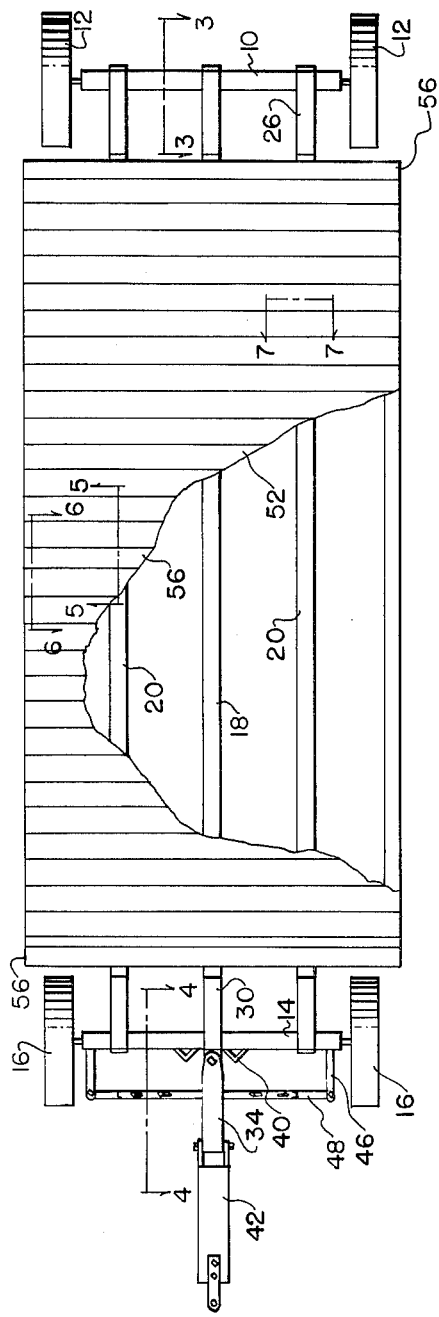
FIG. 2 is a plan view of a trailer according to this invention with parts broken away for clarity.

Referring to FIG. 1, it may be seen that various stakes 60 may be provided to better contain the load upon the trailer. Various and sundry types of beds may be built upon the floor unit constructed of the planks 52 and channels 54.

The floor of the trailer is wider than the wheels. The floor of the trailer is flat and the floor terminates and is entirely contained in the fore and aft position between the front and rear wheels. I.e. there is no attempt to extend the floor over the wheels and make an irregular shaped floor. Also, it will be noted that the top of the floor unit is as close to the lowest part of the bed unit as is possible and still have the plank 52 on top of the runners 18 and 20. Furthermore, it will be noted that the lowest portions of the trailer extend in a forward and a rearward position. I.e. the runners 18 and 20 extend forward and rearward so that should the trailer drag irregular or uneven ground, the runners 18 and 20 will act as skids permitting the trailer to be skidded along the ground.

Therefore, it may be seen that I have provided a trailer with an extremely low bed which still has considerable clearance above the ground. I have chosen to have a flat bed between the wheels in the forward and rear direction, but the bed extending wider than the wheels in a width position.

It will be apparent that the embodiment shown is only exemplary and that various modifications can be made in construction, materials, and arrangement within the scope of the invention as defined in the appended claims.

I claim as my invention:

1. An agricultural trailer comprising:
    (a) a rear axle with two wheels,
    (b) a front axle with two wheels,
    (c) a plurality of channel shaped runners connecting the front and rear axles,
    (d) the top of each of the runners below the top of each of the axles,
    (e) the bottom of each of the runners below the bottom of each of the axles,
    (f) a flat floor unit attached onto the top of the runners,
    (g) the floor unit extending wider than the wheels,
    (h) the floor unit contained forwardly and rearwardly between the wheels,
    (j) means attached to the front axle for towing and guiding the trailer,
    (m) the rear and front axles rectangular in cross section and some of the channel shaped runners attached thereto with
    (n) the bottom flange of the channel shaped runners extending beyond the web and top flange of the channel shaped runners,
    (o) said bottom flange extending under and around the axle and welded to the outside thereof, and
    (p) a strap extending from the top of the top flange to the top of the axle and securely welded to each.

2. The invention as defined in claim 1 wherein the means attached to the front axle for towing and guiding includes
    (s) a vertical tube welded to the front of the front axle,
    (t) a tongue,
    (u) a pin pivoting the tongue to the vertical tube,
    (v) a bumper welded to the front of the front axle on each side the tube,
    (w) a hitch pivoted about a horizontal axis to the tongue,
    (x) connecting bars pivoted to the tongue bteween the vertical tube and the hitch, and
    (y) means interconnecting the connecting bars and the front wheels responsive to movement of the tongue.

3. The invention as defined in claim 1 wherein the floor unit includes
    (s) wooden planks bolted to the channel shaped runners crosswise of the trailer, and
    (t) a stringer extending lengthwise bolted to the ends of each plank on each side of the trailer.

4. The invention as defined in claim 3 wherein the floor unit also includes
    (v) channel irons welded to the runners at the front and rear of the floor unit and interspaced in the floor unit with the wooden planks,
    (w) said channel irons also bolted to said stringers.

References Cited by the Examiner

UNITED STATES PATENTS

| | | |
|---|---|---|
| 1,272,116 | 7/1918 | Russell. |
| 1,677,376 | 7/1928 | Hagadone _____ 280—2 X |
| 1,730,943 | 10/1929 | Parker _____ 280—2 X |
| 1,782,053 | 11/1930 | Synck _____ 280—103 |
| 2,256,037 | 9/1941 | Reid _____ 280—106 |
| 2,514,785 | 7/1950 | Nechville et al. _____ 296—8 |
| 2,559,142 | 7/1951 | Woodworth _____ 296—8 |
| 2,791,439 | 5/1957 | Swanson _____ 280—106 |
| 2,801,863 | 8/1957 | Raney et al. _____ 280—106 |

BENJAMIN HERSH, *Primary Examiner.*

KENNETH H. BETTS, *Examiner.*